United States Patent [19]

de Zuloaga Amat

[11] 3,950,207

[45] Apr. 13, 1976

[54] PROCESS FOR THE MANUFACTURE OF MULTILAYER IMPERMEABLE STRIPS

[75] Inventor: Eusebio de Zuloaga Amat, Barcelona, Spain

[73] Assignee: Texsa S.A., Spain

[22] Filed: June 17, 1974

[21] Appl. No.: 480,305

Related U.S. Application Data

[63] Continuation-in-part of Ser. No. 260,266, June 6, 1972, abandoned.

[52] U.S. Cl. ............... 156/308; 156/337; 156/498; 428/489
[51] Int. Cl.² .......................................... C09J 5/12
[58] Field of Search ............. 117/119.2, 119.4, 168; 156/48, 56, 80, 244, 282, 307, 308, 309, 311, 337, 498, 550; 161/236, 237; 264/348; 428/489, 490

[56] References Cited
UNITED STATES PATENTS

| | | |
|---|---|---|
| 2,989,414 | 6/1961 | Pecker .................................. 117/14 |
| 3,252,851 | 5/1966 | Benson ................................ 161/236 |
| 3,620,898 | 11/1971 | Harris et al. ......................... 161/160 |
| 3,698,980 | 10/1972 | Addison ............................... 156/282 |

Primary Examiner—William A. Powell
Assistant Examiner—Robert A. Dawson
Attorney, Agent, or Firm—McGlew and Tuttle

[57] ABSTRACT

A process for manufacturing impermeable strips formed by a plurality of layers in a continuous process wherein at least two single or compound flexible plastic layers e.g. polyethylene or thin webs are made to pass under pressure through the nip between two rollers rotating in opposite directions, the bonding material between the layers being asphalt, or an asphalt mixture, in fluid state distributed uniformly between the plastic surfaces to be joined, the heat of the fluid asphalt being prevented from deteriorating the plastic webs by their being cooled with the application of a water film to the respective surface of each plastic web opposite to the asphalt contacting surfaces.

12 Claims, 2 Drawing Figures

PROCESS FOR THE MANUFACTURE OF MULTILAYER IMPERMEABLE STRIPS

CROSS-REFERENCE TO RELATED APPLICATION

The present application is a continuation-in-part of U.S. Pat. application Ser. No. 260,266, filed June 6, 1972, by the present inventor and now abandoned.

BACKGROUND OF THE INVENTION

1. FIELD OF THE INVENTION

The present invention relates to a process for the manufacture of multilayer impermeable strips for use, for example, in the building industry, particularly for making damp proof floors. Multilayer strips of this nature are commonly used for this purpose and, thus, the object of this invention is a system for making said strips and which offers certain advantages allowing the disadvantages ordinarily encountered in the diverse stages of the process to be overcome.

2. PRIOR ART

Various laminating procedures are disclosed the prior art. Thus, Harris U.S. Pat. No. 3,620,878 discloses the formation of a "sandwich" construction in which a foam sheet is laminated, by an adhesive, to a heat-shrinkable film to provide a heat-shrinkable cushioning structure. The foam material and the film material are fed between a press roll and a chill roll, and adhesive is extruded between the foam and the film into the "nip" therebetween. While this patent discloses direct chilling at the adhesion point, it is not capable of solving the technical problems involved in manufacturing multi-layer impermeable strips such as formed by the present invention, as, using the Harris procedure, the thin layers of plastic material would not properly adhere to the thick molten asphalt.

Addison U.S. Pat. No. 3,698,980 initially applies asphalt to paper after which a polypropylene fabric is applied to the asphalt. The polypropylene is in the form of woven strands which are longitudinally oriented, and the resultant laminated material is attended as a fabric wrapping material. In Addison, the propylene fabric must be thicker than the plastic layer used in the procedure of the present convention and the fabric structure absorbs the retractions caused by heating. Furthermore, the paper used in Addison has a greater dimensional stability than does plastic as it is not subject to molecular orientation phenomena and is not subject to transitions. The wrapping material produced by the Addison procedure cannot be used as a water-proof covering for roofs, terraces and the like, and thus is disadvantageous from the standpoint of the type of material intended to be produced by the process of the present invention.

Benson U.S. Pat. No. 3,252,851 is directed to the production of a membrane liner in the form of an impermeable sheet material which may be used as a water and vapor barrier membrane in certain types of constructions and also as a water-retaining liner in other types of constructions. In Benson, short intervals are left between the application of hot asphalt to plastic films and the cooling of the films, and this is disadvantageous from the standpoint of producing impermeable strips in a continuous process as in the present invention.

Pecker U.S. Pat. No. 2,989,414 discloses a method of imparting dimensional stability to felt back surface coverings, in which a water filmed roller is used for the purpose of affecting the introduction of a controlled amount of water into a coated web. The material is cooled prior to the action of rolling the material with a roll dipped in water. The procedures suggested by Pecker are inapplicable to a process for manufacturing impermeable strips formed by a plurality of layers in a continuous process and useful in particular for making damp-proof floors.

Above U.S. Pat. No. 2,893,907 teaches principally the product to be prepared, which is admitted as known in the present invention, but it does not teach any similar manufacturing process.

As distinguished from the prior art procedures mentioned above, the present invention concerns a process for the manufacture of waterproof sheets for use in the building trade, particularly for waterproofing of floors. In order better to perform their function and, at the same time, to facilitate their application, these waterproof sheets are usually compound sheets, formed by very thin plastic sheets alternating with substantially thicker asphalt layers, the simplest waterproof sheet being formed of two outer plastic sheets and an inner asphalt layer. The asphalt layer may consist of asphalt only or it may be an asphalt mixture containing 65–70% asphalt, 25–30% slate shale and 5–10% of latex or a latex-type elastomer.

In these compound sheets, apart from its adhesive function, the asphalt or asphalt mixture has also the more important function of waterproofing. In order to fulfill this function, the asphalt or asphalt mixture must be substantially thicker than the necessary minimum thickness for adhesive purposes.

In order to form the asphalt or asphalt mixture into a sheet layer and bind it to the adjacent plastic sheets, it is necessary to melt it and bring it into contact with the plastic sheets but, since the melting temperature of the asphalt is normally higher than that of the plastic sheets, the important problem arises, in this operation, of avoiding the melting of the plastic sheets when they contact the molten asphalt. This problem is less important when the asphalt layer is thin with respect to the plastic sheets used, since in such case the heat contained in the asphalt layer and partially transferred to the plastic sheets is not sufficient to cause melting of the plastic and may be removed with delayed refrigeration, such as happens in U.S. Pat. Nos. 2,989,414; 3,252,851 and 3,698,980.

The problem solved by the present invention is serious. The essence of the invention resides in the fact that a simple pair of compression rollers performs the following operations simultaneously: (a) rolling of the molten asphalt or asphalt mixture; (b) bonding of the asphalt or asphalt mixture to the adjacent plastic sheets and (c) cooling of these sheets precisely at the time and place when and where they contact the molten asphalt or asphalt mixture, by way of layers of water picked up by the rollers as they turn.

What is really an achievement of the present invention is to obtain a thick strip (about 4 mm thick) having two very thin layers (0.02 to 0.09 mm thick) of an extremely flexible material (polyethylene) and a thick layer of asphalt placed between them. This is not easily done, since the asphalt does not easily adhere to the polyethylene. The process of the invention makes it possible to obtain a perfect adhesion in such a type of strip, in which the proofing base is the plastic layers, whereas the thick asphalt layer acts both as a protective and as adhesive.

SUMMARY OF THE INVENTION

In the process according to the invention at least two continuous layers or flexible plastic webs having therebetween, as adhesive medium, an evenly distributed layer of asphalt or asphalt mixture, the thickness of which may be adjusted as required, are bonded together under pressure, the asphalt or asphalt mixture being applied hot in fluid state, the plastic webs being cooled by a water film applied to their surfaces opposite to the asphalt contacting surfaces, thereby obviating detrimental alterations which would take place in the webs or layers due to the heat given off by the molten asphalt or asphalt mixture.

The layers or webs may be of any suitable plastic, for example polyethylene sheets of suitable thickness. Normally, a thin plastic layer is preferred, e.g. from about 0.01 mm to about 0.10 mm thick. The molten asphalt layer is relatively thicker, preferably in the range of about 4mm, and it may consist of asphalt only or if may be an asphalt mixture containing 65–70% asphalt, 25–30% slate shale and 5–10% latex or a latex-type elastomer. In the present specification, the word "asphalt" is used to mean either asphalt along or an asphalt mixture of the type described in the preceding sentence.

In one embodiment, two layers or plastic webs partially wrap respective rollers rotating in opposite directions, there being formed between these rollers, with respective webs wrapped therearound, a nip into which a flow of fluid asphalt or asphalt mixture is evenly poured and subjected to compression to form the multilayer strip.

The two rollers used for producing the bonding of the plastic web layers to the intermediate asphalt layer are adjustable in position with a view to providing a wider or narrower nip, as required, in order to control the thickness of the asphalt layer or allow space for a larger number of component layers of the multilayer strip.

Two or more pairs of rollers may act downstream in order to add further plastic web layers and asphalt layers to the simple initial three layer strip to form a multilayer strip of the required number of layers.

According to one process embodying the invention, the rollers operate partially submerged in water in order to create around their periphery a water film which is applied to the roller contacting surface of the respective plastic web layer for cooling thereof.

The rollers may be cooled by internal circulation of water flowing through suitable means fitted to their axial support points.

DESCRIPTION OF THE DRAWINGS

Further objects and features of the invention will be disclosed in detail in the following description, with reference to the attached illustrative drawings wherein.

DETAILED DESCRIPTION OF THE INVENTION

Figure 1:
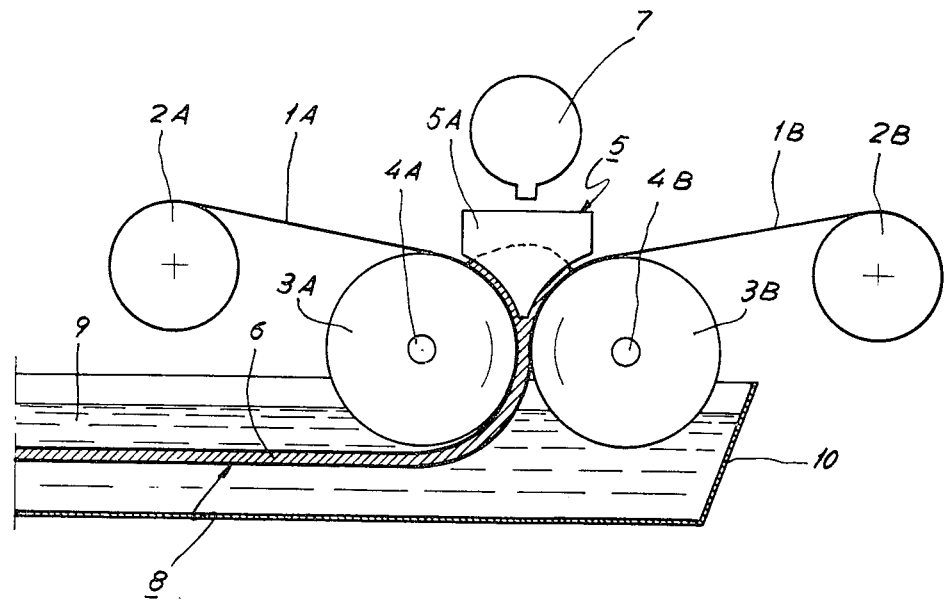
FIG. 1 is a diagrammatic side elevation of one embodiment of a device for the manufacture of multilayer strips according to the invention.
Figure 2:
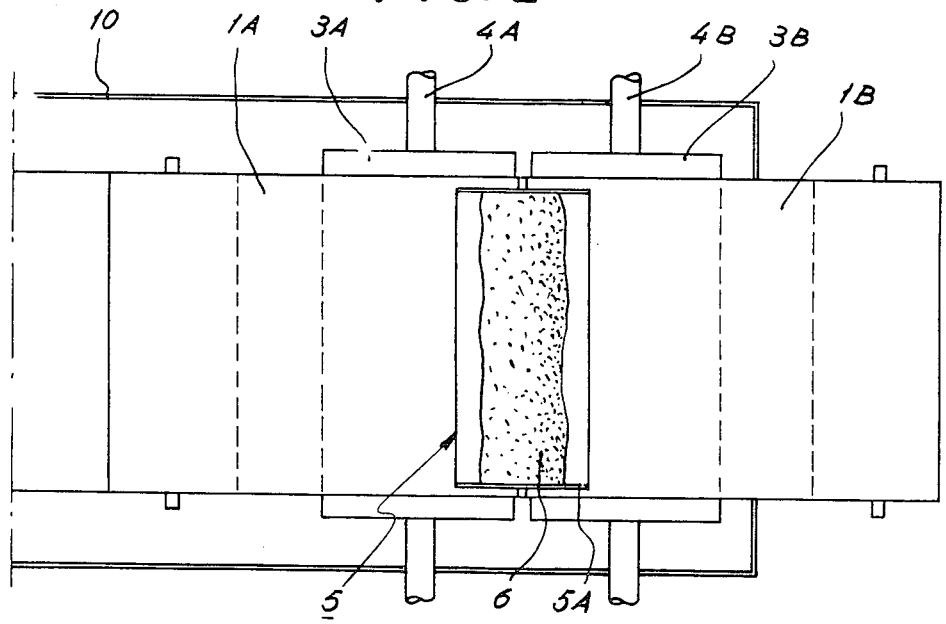
FIG. 2 is a top plan view of the device of FIG. 1.

In the process illustrated in the figures, two layers 1A and 1B of flexible plastic web, being fed from respective reels 2A and 2B, partially wrap cylindrical rollers 3A and 3B which are parallelly disposed and rotate in opposite directions so that the plastic webs converge in a downward direction. Rollers 3A and 3B rotate on shafts 4A and 4B connected to relative drive means.

Disposed above the rollers 3A and 3B there is an asphalt applicator box 5 which, in its simplest form, comprises two end walls 5A, the two rotating rollers 3A and 3B enclosing the open bottom side of the box. Molten asphalt or a molten asphalt mixture 6 is poured into the box 5 from a feed source 7 and is distriubted over the nip between the rollers and roller wrapping webs 1A and 1B. Alternatively two series of rollers arranged parallel to the plastic webs for transfer of the asphalt or asphalt mixture thereto could be used.

Thereafter the combined rotation and compression of the cylindrical rollers 3A and 3B creates a pressure against the plastic web layers 1A and 1B and the asphalt layer 6 sandwiched therebetween to form the simplest or three layer construction of the multilayer strip.

The thickness of the asphalt layer 6 is adjusted as required by increasing or reducing the nip dimension between rollers 3A and 3B by way of suitable adjustment means attached thereto.

The multilayer strip is submerged in water 9 contained in a beck 10. The cylindrical rollers 3A and 3B are partially submerged in the water 9, whereby they pick up a water film on their external surface and which is transferred to the roller contacting surface of the plastic web layers 1A and 1B. Thereby the plastic web layers or sheets 1A and 1B are cooled precisely at the time and place when and where they contact the molten asphalt, by means of the layers of water picked up by the rollers 3A and 3B as they turn in contact with the water 9 in beck 10. This arrangement is necessary to prevent the heat of the molten asphalt 6 from deteriorating the plastic webs 1A and 1B which are readily damaged by such heat. The problem of immediately cooling the plastic web layers to prevent the heat of the molten asphalt 6 from deteriating the layers is important in the case where the layer of molten asphalt is relatively thick, as in the present invention, and is of relatively little importance when the asphalt layer is thin with respect to the plastic sheets used since, in the latter case, the heat contained in the asphalt layer and partially transferred to the plastic sheets is not sufficient to cause melting of the plastic and may be removed with delayed refrigeration, as suggested in Pecker U.S. Pat. No. 2,989,414, Benson U.S. Pat. No. 3,252,851 and Addison U.S. Pat. No. 3,698,980 mentioned above.

The purpose of passing the multilayer strip 8 through the water 9 is to complete cooling and stabilization of the strip. In order to aid in the above cooling of the plastic sheets precisely at the time and place when and where they contact the thick layer of molten asphalt, the invention also contemplates having water circulate in the interior of the cylindrical rollers 3A and 3B passing thereto through tubular shafts 4A and 4B.

In order to obtain multilayer strips comprising a larger number of layers, the initial three layer strip, formed by two plastic web layers e.g. polyethylene of about 0.02 mm to 0.09 mm thickness and an intermediate asphalt layer, e.g. 4 mm thickness is passed through similar devices in such a way that the three layer strip and a further plastic web are fed through each of such devices, together with the relative intermediate asphalt layer.

The invention contemplates other embodiments of the device for the multilayer strips obtained by the process, among which there is one formed by endless conveyor belts which carry the plastic webs to which the layer of asphalt is applied with a doctor blade, with the layers being subjected to a suitable pressure, it being possible to provide a plurality of the layers by using a suitable number of endless belts.

The heads are submerged in water.

The rollers are slightly rough and are 40 cms minimum diameter.

The water is entrained by the rollers and wets the plastic 30 cms before it contacts the asphalt at 180°C.

The water film trapped or inserted between the plastic and the roller evaporates on contact with the asphalt at 180°C, whereby the double cooling effect of:

a. preventing of any further heat increase, and b. increase of cooling effect by absorption of 80 cal/g as the water passes from liquid phase, to steam phase is achieved.

This completely new system has enabled the use, never achieved before, of a high pressure — low density polyethylene film having a melting point of 95°C approximately and using even 50 gauge films, equivalent to 0.012 mm which are the minimum thicknesses currently being manufactured. All this is achieved as the laminate is being manufactured.

In this process the plastic runs right from before the roll nip to the laminate take-up submerged in water and in this way it is possible to submerge the asphalt at 180°C in the water.

The system is really absolutely necessary when, as in the invention, asphalt layer thicknesses of around 1 to 2 mm are used, since the ratio between the great heat mass of the asphalt and the plastic mass is as high as 200 : 1.

A further advantage of this process is that when the plastic leaves the process, it has the same physical and chemical properties as before the process, something not achieved with any other existing process.

This process enables the product to be made at speeds of from 40 meters per minute to the unbelievable speed of 1 meter per minute.

It can also be added as a differentiating factor that this process is completely continuous from the material entry to winding up and packing.

What I claim is:

1. Process for the manufacture of multilayer moisture-impermeable strips having at least two very thin continuous flexible plastic layers bonded together by an adhesive medium constituted by a layer of asphalt, the thickness of which is a large multiple of the thickness of the plastic layers and is adjustable at will, said process comprising the steps of continuously feeding at least two very thin strips of the flexible plastic in spaced facing relation to each other to define a space between their facing surfaces; continuously supplying the asphalt, in a hot molten condition, into such space; continuously bonding the very thin strips to the asphalt by supplying pressure to the outer surfaces of the strips to subject the strips and the asphalt to compression to form a three-layer multi-layer moisture-impermeable strip; simultaneously with such pressure application, and in the zone of pressure application, continuously cooling the very thin strips by conducting heat away from the outer surfaces thereof while the strips are subjected to compression; and thereafter further cooling the multi-layer strip.

2. Process for the manufacture of multilayer moisture-impermeable strips according to claim 1, wherein the two very thin strips of flexible plastic are partially wrapped around respective rollers rotating in respective opposite directions to form a nip between the two strips wrapped around the rollers; continuously supplying the hot molten asphalt into the nip; and subjecting the two strips and the asphalt to compression by the two rollers to form a three-layer moisture-impermeable strip.

3. Process for the manufacture of multilayer moisture impermeable strips according to claim 1, wherein the layer of asphalt consists of an asphalt mixture containing 65–70% asphalt, 25–30% slate shale and 5–10% latex-type elastomer.

4. Process for the manufacture of multilayer moisture impermeable strips, according to claim 2, wherein the rollers are each partially submerged in water thereby to form a water film on their outer surface which is applied to the roller contacting surface of the associated plastic strip for cooling thereof.

5. Process for the manufacture of multilayer moisture impermeable strips according to claim 2, wherein the rollers are cooled by circulation of water to their interior, and passing the water through their axial support points.

6. Process for the manufacture of multilayer moisture-impermeable strips according to claim 2, comprising providing at least one additional pair of oppositely rotating rollers downstream of the first-mentioned oppositely rotating rollers; and feeding, between each pair of additional rollers, the multi-layer strip, hot molten asphalt and an additional very thin strip of the flexible plastic for such compression by the additional rollers with such simultaneous cooling of the additional strip and the multi-layer strip, until a multi-layer strip composed of a predetermined number of layers is formed.

7. Process for the manufacture of multilayer moisture impermeable strips according to claim 6, wherein the nip between each pair of rollers is adjusted as required whereby the desired thickness of asphalt is obtained and the desired number of component layers of the multilayer strip is obtained as required.

8. In the process for the manufacture of multi-layer moisture-impermeable strips having at least two very thin continous flexible plastic layers bonded together by an adhesive medium constituted by an evenly distributed layer of asphalt, the thickness of which is a large multiple of the thickness of the plastic layers and is adjustable at will, and wherein the layers are bonded together under pressure with the asphalt being applied in the hot molten condition between the layers, the improvement comprising continuously feeding at least two very thin strips of the flexible plastic in spaced relation to each other to define a space between their facing surfaces by partially wrapping the strips around respective rollers rotating in respective opposite directions whereby a nip is formed between the strips partially wrapped around the rollers; continuously supplying the hot molten asphalt into the nip; continuously bonding the very thin plastic strips to the hot molten asphalt by applying pressure, through the rollers, to the outer surfaces of the strips to subject the strips and the asphalt to compression to form a three-layer multi-layer moisture-impermeable strip; simultaneously with such pressure application and in the zone of the strips wrapped around the respective rollers, continously cooling the very thin strips by continously applying water films to the outer surfaces of the strips in engagement with the rollers, thereby avoiding detrimental alterations to the plastic material of the strips due to the heat given off by by the molten asphalt; and thereafter cooling the multi-layer strip by immersing it in a water bath.

9. Process according to claim 8, wherein the plastic layers comprise polyethylene.

10. process according to claim 8, wherein the plastic layers are of a thickness from about 0.01 mm to about 0.10 mm.

11. Process according to claim 8, wherein the asphalt thickness is of the order of about 4 mm.

12. Process according to claim 8 wherein the layer of asphalt consists of an asphalt mixture containing 65–70% asphalt, 25–30% slate shale and 5–10% latex-type elastomer.

* * * * *